United States Patent Office 3,522,048

Patented July 28, 1970

3,522,048

TWO-COMPONENT HEAT DEVELOPING DIAZOTYPES

Walter J. Welch, Port Dickinson, N.Y., assignor to GAF Corporation, New York, N.Y., a corporation of Delaware No Drawing. Filed Dec. 9, 1965, Ser. No. 512,791

Int. Cl. G03c *1/52, 1/60*

U.S. Cl. 96—91 5 Claims

ABSTRACT OF THE DISCLOSURE

Heat developing two-component diazo sensitizing composition wherein the light-sensitive component is a p-chlorobenzene sulfonate diazonium salt of a morpholine, piperidine, piperazine, or thiomorpholine-substituted p-phenylamino compound the nucleus of which can be optionally independently substituted in the 2 and 5 positions, with alkyl, hydroxyalkyl, alkoxy, hydroxyalkoxy, and alkoxyalkoxy groups.

The present invention relates in general to the production of light-sensitive, heat developable diazotype photoprinting materials and in particular to high speed, two-component sensitizing compositions of improved thermal stability useful in preparing same.

As is well known, two-component diazotype photoprinting materials will usually comprise a supporting sheet, such as paper or film, having a light-sensitive layer theeon containing, inter alia, an azo coupling component and a light-sensitive diazonium compound stabilized against premature coupling by inclusion of an acid stabilizer. Upon exposure of such coating to actinic radiation, the light-sensitive diazonium compound undergoes a photolytic decomposition in the light-struck areas, the decomposition products being incapable of reaction with the azo coupling components when subjected to the alkaline conditions employed in the development operation. Development of the exposed material will usually be effected with the use of gaseous ammonia, whereupon the acid stabilizer is neutralized with the concomitant shift in the pH of the diazo layer initiating the azo dye-forming coupling reaction between residual diazonium compound and coupler whereupon an azo dye image forms in the non-light struck areas. Despite the extensive commercial adoption of the foregoing photoprinting technique, certain disadvantages nevertheless attend its practice. For example, alkaline development operations based upon the use of ammonia require the use of special equipment in order to eliminate the problems associated with noxious ammonia vapors. The additional expense involved can, of course be economically burdensome.

As a consequence, considerable industrial activity has centered around the research and development of photocopying techniques based on the use of light-sensitive diazonium compounds which would obviate any necessity for the use of extraneous chemicals to supply the alkaline environment necessary to dye-forming development.

Paramount among the techniques heretofore evolved in pursuance of the foregoing objectives, are those which involve the use of two-component diazo sensitizing compositions in which the dye-forming, coupling reaction is capable of initiation by the action of heat alone, i.e., the so-called "thermal" diazotype compositions. The latter, characteristically, contain one or more reagents having an acid to neutral reaction and which, on heating, dissociate to yield an alkaline reacting compound. Thus, when thermal dissociation of such a substrate proceeds to an extent sufficient to impart an overall alkaline pH to the diazo layer, the coupling reaction is initiated in the non-light struck portions, i.e., those areas corresponding to the opaque areas of the negative or positive being reproduced.

Heretofore, however, considerable difficulties have been encountered in connection with attempts to provide thermal diazotype papers possessed of the desired thermal stability. In general, the problems involved are traceable to the fact that the diazo sensitizing component, conventionally provided in the form of a stabilized salt, exhibits a pronounced tendency to decompose at temperatures well below those usually employed in the heat development operation. This, of course, tends to vitiate substantially any attempt to obtain a photocopy having satisfactory photographic qualities, i.e., density, contrast, saturation and the like.

In an attempt to overcome or otherwise alleviate the problems relating to thermal instability of heat developable two-component diazotype compositions thus far promulgated, the art has resorted to a wide variety of remedial techniques. For example, it has been suggested by numerous prior art investigators that the diazonium salt and coupler respectively be provided in separate layers or coatings in order to minimize any possibility of premature coupling. In general, such techniques are implemented by applying to opposite side of a porous base, a light-sensitive diazonium layer and an alkaline-generating layer respectively. Thermal development is then effected by subjecting the exposed element to elevated temperatures sufficient to cause thermal decomposition of the alkaline-generating compound with the concurrent generation of alkaline vapors. The latter diffuses or otherwise migrates to the light-sensitive diazonium layer with development occurring in the manner explained hereinbefore. When utilizing such a procedure it is not necessary that the generation of alkaline material occur as a result of thermal decomposition since the alkaline material may diffuse as such. Other variants of the foregoing procedures which rely for operability on the physical isolation of coupler and diazo have likewise been suggested.

However, in the vast majority of instances, such techniques have been found to involve relatively serious practical difficulties which have correspondingly tended to retard any significant degree of commercial exploitation. One of the principal objections relates to the lack of speed of such systems, explainable by reference to the fact that the coupling reaction rate being inherently dependent upon the rate of diffusion of the alkaline material into the diazo layer, is intolerably low.

Moreover, the density and brightness of the image obtained will invariably be unsatisfactory. Since the effective speed of the reproduction system is also a function of the rate at which the diazonium compound is decomposed, a preference for the so-called high speed diazo compounds has quite naturally developed. However, the use of high speed diazo compounds in this connection has thus far provided only marginal advantage since the shelf life of diazo compositions containing same is at best severely limited. Such problems will usually manifest themselves in the form of background discoloration in the final print material.

The foregoing problems have been found to be particularly evident in connection with the use of two-component heat developable diazo sensitizing compositions wherein the light-sensitive compound comprises a diazo derivative of a para-phenylenediamine of the following structural formula:

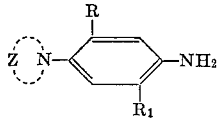

wherein Z represents the non-metallic atoms necessary to complete a heterocyclic nucleus selected from the group consisting of morpholine, thiomorpholine, piperidine and piperazine, and R and $R_1$ independently represent hydrogen, lower alkoxy containing from 1 to 4 carbon atoms, e.g., ethoxy, butoxy, etc., lower alkyl, e.g., methyl ethyl, propyl, etc., lower hydroxyalkyl, e.g., 2-hydroxyethyl, lower hydroxyalkoxy, e.g., 2-hydroxypropoxy, 3-hydroxypropoxy, 4-hydroxybutoxy, etc.; alkoxyalkoxy such as 2-ethoxyethoxy, 2-ethoxypropoxy, 3-ethoxypropoxy, etc.

Diazo derivatives of compounds encompassed by the above formula have heretofore constituted a particularly preferred class of compounds for use in thermal diazotype formulae since they possess an exceptionally high order of coupling activity. Conventionally, such diazo derivatives are employed in the form of their stabilized double salts with zinc chloride, tin chloride, cadmium chloride and the like. Despite the adaptability of such diazo compounds to the thermal diazotype process, certain limitations have been found to attend their use being due primarily to the low thermal decomposition points characterizing their stabilized salts.

Thus, in accordance with the discovery forming the basis of the present invention it has been found that the thermal stability of heat developable light-sensitive diazo compositions wherein the diazo component comprises a diazo derivative of a compound of the above illustrated formula, can be synergistically modified to advantage by employing such diazo derivative in the form of a specific stabilized salt derivative.

Therefore, a primary object of the present invention resides in the provision of heat developable diazo sensitizing compositions wherein the above and related disadvantages are eliminated or at least mitigated to a substantial extent.

Another object of the present invention resides in the provision of heat developable diazo sensitizing compositions of exceptionally high speed and which yield prints characterized by improved density, contrast, saturation, absence of background discoloration and the like.

A further object of the present invention resides in the provision of heat developable diazo sensitizing compositions having excellent thermal stability being advantageously adapted for high-speed thermal diazotype reproduction methods.

Other objects of the present invention will become apparent hereinafter as the description thereof proceeds.

The attainment of the foregoing and related objects is made possible in accordance with the present invention which in its broader aspects is based upon the discovery that the employment of high-speed, light-sensitive diazo compounds in the form of their para-chlorobenzene sulfonate salts provides heat developable diazo sensitizing compositions exhibiting a high order of thermal stability, i.e., to an extent heretofore considered unattainable. Particularly beneficial results in respect of thermal stability, photographic reproduction quality, e.g., density, contrast, etc., are found to obtain with para-chlorobenzene sulfonate salts which can be represented by the following structural formula:

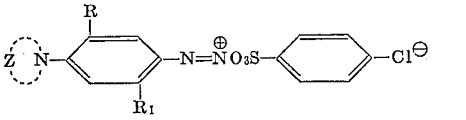

wherein R, $R_1$ and Z have the significance given above. Compounds of the above formula may be readily and conveniently prepared by a procedure which involves treating the diazotized amines prepared via standard diazotization techniques, with an aqueous solution of para-chlorobenzene sulfonic acid.

As particular examples of compounds encompassed by the above formula and found to be particularly suitable for use in the compositions described herein, there may be mentioned the following:

2,5-diethoxy-4-morpholinobenzenediazonium-p-chlorobenzene sulfonate
2,5-dibutoxy-4-morpholinobenzenediazonium-p-chlorobenzene sulfonate
2,5-dihydroxyethoxy-4-morpholinobenzenediazonium-p-chlorobenzene sulfonate
2-(2-hydroxyethoxy)-5-(2-ethoxyethoxy)-4-morpholinobenzene-diazonium sulfonate
2,5-diethoxy-4-piperidinobenzenediazonium-p-chlorobenzene sulfonate
2,5-dibutoxy-4-piperazinobenzenediazonium-p-chlorobenzene sulfonate Diazo coupling components which can be utilized in the compositions of the present invention may be selected from any of those conventionally employed in thermal diazotype formulae. As particular examples of couplers found to be suitable in this regard, specific mention may be made of the following:

2-(m-hydroxyphenoxy)ethanol
Sodium 6,7-dihydroxynaphthalene-2-sulfonate
2,3-dihydroxynaphthalene
1,8-dihydroxynaphthalene
Phloroglucinol
Resorcinol
Octylresorcinol
Alpha-resorcylamid
3-methyl-1-phenyl-5-pyrazolone
Acetoacetanilide
H-acid
2,3-dihydroxynaphthalene-6-sulfonic acid
2,5-xylenol
2-methyl resorcinol, etc.

as well as mixtures comprising 2 or more of such compounds.

Heat responsive reagents having an acid to neutral reaction at room temperature and which are adapted to yield on heating to temperatures of 100 to 200° C. an alkaline reacting compound for neutralizing the acid in a light-sensitive photoprinting material of this invention include trichloro acetate and its derivatives which yield ammonium, nitrogen bases on heating, alkali metal salts of strong organic acids which are decomposed on heating to form basic compounds such as alkali metal salts of malonic, oxalic, maleic or benzene sulphinic acids; alkali metal salts of aliphatic monocarboxy acids of 1 to 3 carbon atoms having negative substituents such as halogen, CN or $NO_2$ in the alpha and/or beta positions; and of these, especially the alkali metal (e.g., Na, K), ammonium and nitrogen base salts of trichloroacetic acid.

Accelerators or auxiliary sources of alkali such as dicyandiamide, guanidine sulfate and the like can be used advantageously with any of the aforesaid reagents having an acid to neutral reaction.

In addition, acid stabilizers such as citric acid, tartaric acid, boric acid, acetic acid and similar acid reacting compounds can be used to prevent premature coupling of the diazonium salt and azo coupling component.

In addition to the foregoing materials there can also be included reagents commonly employed in diazotype photoprinting materials as for example, intensifiers such as ammonium sulfate, zinc chloride, magnesium chloride, nickel sulfate, etc.: stabilizing agents such as thiourea, or thiosinamine; accelerators such as 1-allyl-3-β-hydroxyethyl-thiourea or 1-allyl-thiourea; hygroscopic agents such as glycol or glycerin; wetting agents such as saponin, lauryl sulfate, keryl benzene sulfonate or oleyl-N-methyltaurine; binders such as polyvinyl alcohol, starch, polyvinyl acetate, etc., pigments such as silica, alumina, etc.

The components of the sensitizing composition are preferably incorporated in a single solution or suspension and applied in a single coating step to the base. The latter may be paper, or film such as regenerated cellulose, cellulose acetate or other plastic films. However the various components of the sensitizing composition can be applied, if desired, in successive coatings—one containing, for example, the diazonium salt, and another the alkali generating heat-sensitive reagent, the azo coupling component being incorporated as preferred in either of the two layers.

The material coated in accordance with the invention is developed after exposure under an opaque pattern on a translucent background, by heating at temperatures ranging from about 100 to about 200° C. and preferably from about 110° C. to about 165° C. at which decomposition or conversion of the acid to neutral reagent to an alkaline reacting compound occurs. This promotes coupling of the residual diazonium compound with the azo coupling component.

The following examples are given for purposes of illustration only and should not be considered in any way as limiting the scope of the present invention. In the examples, all parts given are by weight unless otherwise indicated.

EXAMPLE I

A paper base is coated with the following sensitizing composition:

| Composition: | Parts |
|---|---|
| Water | 100 |
| Guanidine sulfate | 4 |
| Polyvinyl alcohol | 4 |
| Citric acid | 0.5 |
| Acetamide | 2 |
| Magnesium chloride | 1 |
| Sodium 1,3,6-naphthalene trisulfonate | 3 |
| Sodium 6,7 - dihydroxynaphthalene - 2 - sulfonate | 3 |
| Sucrose | 2 |
| 2,5-diethoxy - 4 - morpholinobenzenediazonium-p-chlorobenzene sulfonate | 0.5 |
| Saponin | 0.1 |
| Secondary butyl alcohol | 1 |
| Polyvinyl acetate emulsion | 3 |
| Silica | 5 |
| Sodium trichloro acetate | 2 |

After coating, the paper is dried, exposed to light under a translucent original bearing opaque image areas. The exposed paper is then developed by passing it through a heated chamber maintained at temperatures ranging from 110 to 165° C., whereupon development occurs yielding a positive image having blue image areas of excellent density and brightness. A control sample prepared and processed in identical manner except for the substitution of the 2,5-diethoxy-4-morpholinobenzenediazonium-p-chlorobenzene sulfonate with the chlorozincate salt of 2,5-diethoxy-4-morpholinobenzenediazonium chloride yields a final print having a dye density in the image areas on the order of 25% less than that obtained with the p-chlorobenzene sulfonate diazo derivative. Dye density measurements were taken on an Ansco Macbeth Reflectance Densitometer.

Further, the sample containing the p-chlorobenzene sulfonate diazo derivative exhibited much less background discoloration when compared with the control sample. The 2,5-diethoxy-4-morpholinobenzenediazonium-p-chlorobenzene sulfonate of the foregoing example is prepared according to the following procedure:

Diazotization is effected by treating approximately 0.05 mole of 2,5-diethoxy-4-morpholinoaniline hydrochloride with a sodium comprising 2 N hydrochloric acid and 5 M sodium nitrite. To the diazonium chloride solution which forms there is added 0.055 mole of p-chlorobenzene sulfonic acid in water. The solid precipitate which forms is filtered, washed with ether and partially dried. The solid is collected, triturated with acetone, filtered, rewashed with fresh acetone and ether and dried in vacuo.

Yield of 2,5-diethoxy-4-morpholinobenzenediazonium-p-chlorobenzene sulfonate: 13.55 gms.; decomposition point: 141° C.

EXAMPLE II

A paper base is coated with the following diazo sensitizing composition:

| Compositions: | Parts |
|---|---|
| Citric acid | 0.5 |
| Sodium 6,7-dihydroxynaphthalene-2-sulfonate | 3 |
| Magnesium chloride | 0.5 |
| Sodium trichloroacetate | 3 |
| Sodium 1,3,6-naphthalene trisulfonate | 3 |
| Polyvinyl alcohol | 4 |
| 2,5-bis-(2-hydroxyethoxy) - 4 - morpholinobenzenediazonium chloride | 0.5 |
| Silica | 4 |
| Polyvinyl acetate emulsion | 5 |
| Water | 100 |

After coating, the paper is dried and exposed to light under a translucent original bearing opaque image areas. The exposed paper is then developed by passing it through a heated chamber maintained at temperatures ranging from 110 to 165° C. whereupon there is obtained a positive image having blue image areas of excellent density and brightness. Control samples prepared and processed in identical manner except for the substitution of the 2,5-bis-(2 - hydroxyethoxy) - 4 - morpholinobenzenediazonium - p - chlorobenzene sulfonate with 2,5-bis-(2-hydroxyethoxy) - 4 - morpholinobenzenediazonium chlorozincate salt yielded a final print having a dye density in the image areas on the order of 25% less than that obtained with the p-chlorobenzene sulfonate diazo derivative. Dye density measurements were taken on an Ansco Macbeth Reflectance Densitometer. The diazo compound of the above example is prepared in the manner described in Example V of copending application Ser. No. 422,415, filed Dec. 30, 1965, now abandoned. However, precipitation of the diazo salt is, of course, effected with an aqueous solution of p-chlorobenzene sulfonic acid. Purification and recovery of the p-chlorobenzene sulfonate salt is carried out in the manner described in Example I.

Results similar to those obtained above are obtained when the particular procedures exemplified are repeated but wherein the p-chlorobenzene sulfonate diazo derivative is substituted in equivalent amounts within the range specified with each of the following compounds:

2,5-dibutoxy-4-morpholinobenzenediazonium-p-chlorobenzene sulfonate
2,5-dihydroxyethoxy-4-morpholinobenzenediazonium-p-chlorobenzene sulfonate
2-(2-hydroxyethoxy)-5-(2-ethoxyethoxy)-4-morpholinobenzenediazonium sulfonate
2,5-diethoxy-4-piperidinobenzenediazonium-p-chlorobenzene sulfonate
2,5-dibutoxy-4-piperazinobenzenediazonium-p-chlorobenzene sulfonate
2,5-dibutoxy-4-thiomorpholinobenzenediazonium-p-chlorobenzene sulfonate, etc.

The present invention has been disclosed with respect to certain preferred embodiments thereof and there will become obvious to persons skilled in the art various modifications, equivalents or variations thereof which are intended to be included within the spirit and scope of this invention.

What is claimed is:

1. A two-component, heat-developable diazotype material which comprises a support and a light-sensitive layer thereon comprising an azo coupling component, an acid stabilizer, a neutral to acid salt of a strong, organic acid which yields an alkaline reacting compound on heating to temperatures ranging from about 100° C. to about 200° C., and a light-sensitive compound comprising a diazonium-p-chlorobenzene sulfonate having the following structural formula:

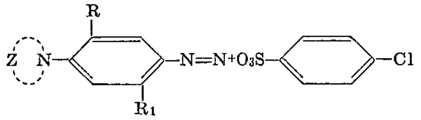

where R and $R_1$ are selected from the group consisting of hydrogen, alkyl, hydroxyalkyl, alkoxy, hydroxyalkoxy and alkoxyalkoxy, and Z represents the non-metallic atoms necessary to complete a heterocyclic nucleus selected from the group consisting of morpholine, piperidine, piperazine and thiomorpholine.

2. The diazotype material of claim 1 wherein both R and $R_1$ are ethoxy and Z represents the atoms necessary to complete a morpholine nucleus.

3. A diazotype material according to claim 1 wherein both R and $R_1$ represent 2-hydroxy and Z represents the atoms necessary to complete a morpholine nucleus.

4. A diazotype material according to claim 1 wherein the neutral to acid salt of a strong, organic acid comprises trichloro acetic acid.

5. A diazotype material according to claim 1 wherein said neutral to acid salt of a strong, organic acid comprises a mixture of guanidine sulfate and sodium trichloro acetate.

References Cited

UNITED STATES PATENTS

| | | | |
|---|---|---|---|
| 1,870,930 | 8/1932 | Sprongerts | 96—91 |
| 2,067,132 | 1/1937 | Schnitzspahn et al. | 260—141 |
| 2,552,355 | 5/1951 | von Glahn et al. | 96—91 |
| 2,694,009 | 11/1954 | Sus | 96—91 |
| 2,774,669 | 12/1956 | Marron et al. | 96—91 XR |
| 3,153,392 | 10/1964 | Klimbowski et al. | 96—91 XR |
| 3,290,150 | 12/1966 | Eenshuistra et al. | 96—91 XR |
| 3,312,551 | 4/1967 | Sus | 96—91 XR |
| 3,326,686 | 6/1967 | Randell et al. | 96—49 XR |
| 3,360,369 | 12/1967 | Amiriti et al. | 96—49 XR |
| 3,379,531 | 4/1968 | Mizianty et al. | 96—49 XR |

TRAVIS BROWN, Primary Examiner

C. BOWERS, Assistant Examiner

U.S. Cl. X.R.

96—49.75